W. SMITH.
SEA WALL, BREAKWATER, AND SIMILAR STRUCTURE.
APPLICATION FILED FEB. 6, 1908.
905,596.
Patented Dec. 1, 1908.
2 SHEETS—SHEET 1.
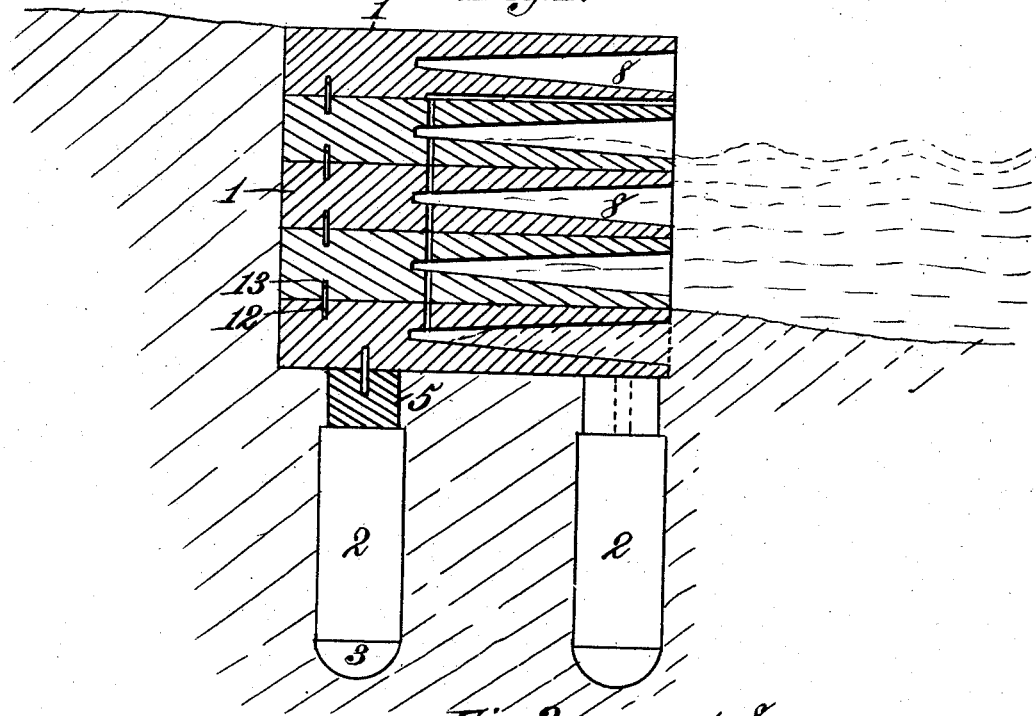
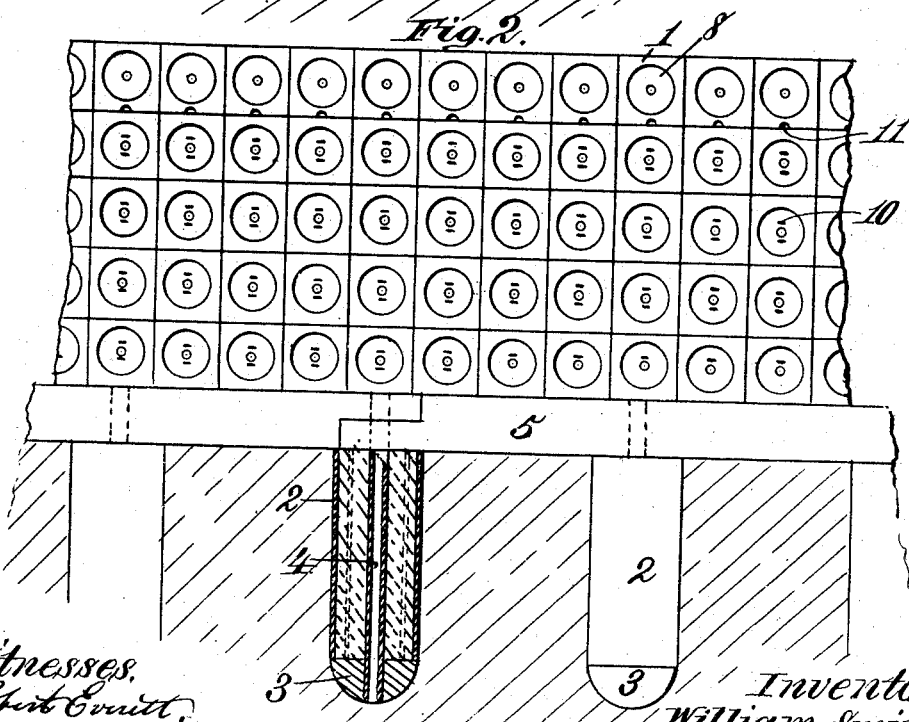

W. SMITH.
SEA WALL, BREAKWATER, AND SIMILAR STRUCTURE.
APPLICATION FILED FEB. 6, 1908.
905,596.
Patented Dec. 1, 1908.
2 SHEETS—SHEET 2.
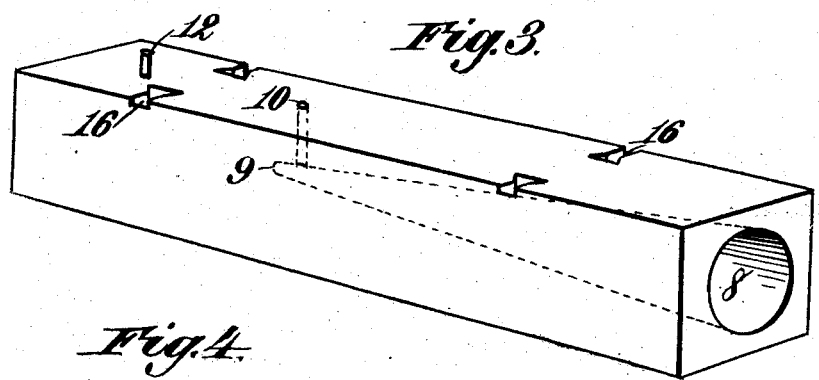
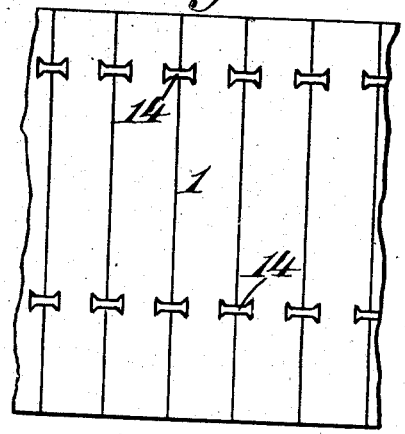
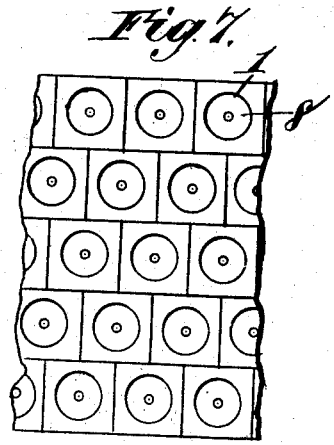
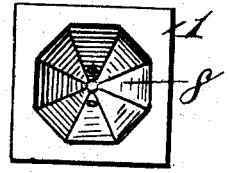
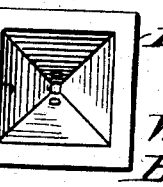
Witnesses.
Inventor.
William Smith.
By
Alvin L. Newmyer
Atty.

UNITED STATES PATENT OFFICE.

WILLIAM SMITH, OF SOMERS POINT, NEW JERSEY.

SEA-WALL, BREAKWATER, AND SIMILAR STRUCTURE.

No. 905,596.　　　　Specification of Letters Patent.　　　Patented Dec. 1, 1908.

Application filed February 6, 1908. Serial No. 414,641.

*To all whom it may concern:*

Be it known that I, WILLIAM SMITH, a citizen of the United States of America, residing at Somers Point, in the county of Atlantic and State of New Jersey, have invented certain new and useful Improvements in Sea-Walls, Breakwaters, and Similar Structures, of which the following is a specification.

My present invention relates to improvements in marine construction, and it has for its object to provide an improved structure adapted for use in the construction of sea-walls, break-waters, piers, bulk-heads, and walls used in the building of light-houses and other structures that are exposed to the waves of the ocean, whereby the pounding action of the waves is eased and reduced to a minimum by cushioning devices, thereby rendering the structure practically indestructible, and enabling a relatively light construction to be used without danger of destruction, the cushioning devices serving to gradually break the waves without permitting them to rise and pass over the top of the wall or structure.

Another object of the invention is to provide blocks embodying the cushioning devices and capable of being readily assembled and locked so as to form a solid wall or structure which is capable of withstanding the pounding action of the waves without danger of disintegration.

To these and other ends, the invention consists in certain improvements and combinations and arrangements of parts, all as will be hereinafter more fully described, the novel features being pointed out particularly at the end of the specification.

In the accompanying drawing: Figure 1 represents a vertical section of a sea-wall or a portion of a break-water built in accordance with my present invention; Fig. 2 represents a front elevation of a section of the wall, the piling supporting the wall or structure being shown; Fig. 3 is a perspective view of a block of the character used in the construction of the wall shown in Figs. 1 and 2; Fig. 4 represents an end view of the block shown in Fig. 3 as viewed from the right; Fig. 5 is a perspective view of a key for locking the blocks firmly in fixed relation; Fig. 6 is a top plan view of the wall; Fig. 7 is a front elevation of a section of a wall showing the blocks assembled in such a manner as to break the joints; and Figs. 8 and 9 are end views showing blocks provided with cells or cavities of different cross-sections.

Similar parts are designated by the same reference characters in the several views.

Sea-walls, break-waters and similar marine constructions embodying my present invention are provided with cells or cavities in their exposed faces to receive water and thereby reduce the shock due to the pounding of the waves thereon, these cells or cavities being normally above the water so that bodies of air will be confined in the cells as the water enters them, the compression of the air serving to yieldingly resist the entrance of the water and thereby gradually arrest the inward movement thereof.

In the present embodiment of my invention, the wall or other structure is built up of a suitable number of blocks 1 that are molded from concrete or other plastic material, the length of the blocks varying according to the character of the structure in which they are used, and according to the violence of the waves which the structure is to resist. In the present instance the blocks are substantially rectangular in longitudinal and transverse section so as to facilitate their assembling and to avoid any cracks or crevices between them, and it is generally preferable to so assemble the blocks, as to present a sloping or receding surface which is exposed to the waves.

In order to secure a firm foundation for the wall or structure, it is necessary in most, if not every case, to provide a substantial piling to support the weight of the structure and prevent its destruction because of moving sands and other causes which would otherwise undermine the structure, and I have provided a novel and improved concrete piling which is preferably employed and is capable of penetrating all marine growth, shells and the like and affords a firm foundation for the support of the structure. This piling structure comprises a suitable number of rows of vertical piles 2 each provided with a metal head 3 on the lower end thereof, the head having a central opening through which extends a central pipe 4. This pipe extends from the head vertically to the top of the pile and projects a suitable distance above the top to provide a pin which enters apertures formed in the adjacent ends of the horizontal steel girders 5, the latter spanning the spaces between the several piles and providing a horizontal platform upon which the structure is built. The central pipe 4 of each pile serves during the construction of the pile to conduct air, steam or other fluid to the under side of the pile, the fluid thus introduced beneath the pile serving to dislodge and remove the material and thus permit the pile to sink to the desired depth, this pipe 4 being surrounded by a mass of concrete molded in place during the construction of the pile and is well adapted to withstand the action of the water. In sinking the piles through rock and other hard substances, this central pipe may receive a drill or may assist in blasting operations.

The blocks are assembled above these girders or beams either in the manner shown in Figs. 2 and 6, wherein the vertical sides of the blocks of each vertical row coincide, or in order to obtain a more solid structure, the blocks may be assembled in the manner shown in Fig. 7, wherein the vertical sides of each horizontal row of blocks are staggered in relation to those of the rows above and below it, the joints between the blocks being thus broken. In either case the lowermost tier or tiers of blocks begin at a level below the sand so that entrance of the water beneath the structure that may undermine it, will be prevented, and in order to insure a structure of the maximum solidity, it is preferable to lay the blocks in concrete so as to seal the cracks between them and firmly unite the blocks to prevent relative displacement.

Each block is provided with a cell or cavity 8 which extends longitudinally thereof and opens at its end exposed to the sea. The length of this cell or cavity may be proportioned according to the violence of the waves to which the structure is to be subjected, and the walls of the cavity or cell preferably converge from the wider or open end to the apex 9. The cavity may be of any desired cross-section, it being of circular form in Fig. 3, rectangular form in Fig. 9 and octagonal form in Fig. 8, but it is preferable in each instance to converge the longitudinal walls of the cell or cavity. As the wider end of the cell or cavity of each block is presented to the wave as it approaches the wall or structure, a substantial portion of the wave will enter the numerous cavities, passing toward the apexes thereof. However, a great number of these cavities or cells are normally above the sea level so that they are filled with air, and the in-flowing water will confine and compress a quantity of air in each cell, the converging walls of the cells offering a considerable friction to the water to absorb the force of the wave, and the consequent reduction in the cross-section of each cell or cavity will cause an acceleration of the movement of the water as it approaches the apex of the cavity, the elastic action of the confined air serving to gradually arrest the movement of the water and to expel the water as the wave recedes.

In order to permit a considerable proportion of the wave to enter the cavities or cells of the wall and thereby prevent deflection of the wave over the wall or structure, it is generally preferable to provide means of escape for a portion of the air confined in the cells or cavities, each block being provided in the present instance with upper and lower vertically extending vents 10 which extend through the upper and lower walls of the block in alinement and registration with one another, and the vents of each block communicate with the corresponding cell or cavity at a point adjacent to the apex thereof, and all the vents communicate with the atmosphere near the top of the structure and preferably at the exposed face of the wall or structure. Any suitable means may be employed for conducting the fluid from this vent to the atmosphere, but it is preferable to provide the blocks of the upper horizontal row each with a longitudinal vent passage 11, each passage communicating with one of the lines of vents of each vertical tier of blocks and leading to the face of the wall or structure. This passage is provided by making a groove in the face of the block so that when the blocks are assembled one above the other, this groove will form a passage which leads from its corresponding line of vents to the atmosphere. The purpose of the vent is to enable a considerable proportion of fluid to escape through it from the apex of each cushioning cell, the reduced pressure in front of the water entering the cavities or cells permitting a considerable proportion of the wave to pass into the wall or structure, its movement being resisted or cushioned until the force of the wave is spent. As the wave recedes the formation of a vacuum within the cushioning cells is prevented by air entering from the atmosphere through the vents into the cavities so that the latter are thoroughly emptied during the periods intervening between the waves.

In order to positively prevent dislodgment of the blocks due to the pressure and pounding of the waves, it is preferable to key the blocks relatively to one another, each block being preferably provided with a locking pin 12 projecting from one side, preferably its upper side, and arranged to register with a corresponding locking aperture 13 formed in the under side of the block next above it, and relative lateral displacement of the blocks is prevented by means of keys, those shown in the present instance being each composed of a block 14 having dove-tailed or enlarged ends 15 which are adapted to fit into correspondingly formed recesses 16 provided in the upper face of each block, the key being dropped in place after the blocks of each row have been assembled, and extend transversely across the crack between each pair of blocks so as to lock them firmly from lateral displacement.

In building sea-walls, bulk-heads and similar structures with blocks embodying my present invention, the rear side of the wall or structure is backed up by the earth so as to prevent the entrance of water behind the structure, but in the building of breakwaters, piers and other structures which are partially or entirely surrounded by the sea, the double or endless formation of the wall will prevent the entrance of the water.

A marine construction built in accordance with my present invention is capable of effectually resisting the waves without damage, as the pounding action due to the dead weight of the water is cushioned and the force of the wave is gradually absorbed by means of the cushioning cells or cavities, and it will be understood that while I have shown the structure in the present instance as built up of blocks or sections, the entire structure may be made in some instances of concrete in the exposed face of which the cushioning cells or cavities are molded, and it will be also understood that while I have described the invention as especially applicable to marine structures, the invention is not so limited, as I contemplate application of the invention to various uses wherein it is desirable to cushion or relieve the shock due to the pounding of a liquid against a wall or other structure.

I claim as my invention:

1. A structure of the class described having wave cushioning devices formed in the exposed face thereof.

2. A structure of the class described provided with inwardly extending wave cushioning cells formed in the exposed face thereof.

3. A structure of the class described provided with air cushioned devices arranged in the exposed face thereof for receiving and absorbing the force of the waves.

4. A structure of the class described having an exposed face of cellular formation, the cells being open to receive the waves and closed at their inner ends to form an elastic cushion.

5. A structure of the class described having an exposed face of cellular formation, the cells being open at one end to receive the wave, the longitudinal walls of the cells tapering to form a closed inner end to confine an elastic cushioning fluid.

6. A structure of the class described having a side of cellular formation which is exposed to the waves, the cells being open at one end and closed at their inner ends to confine an elastic cushioning fluid, and a vent communicating with the inner closed end of each cell for establishing communication between the latter and the atmosphere at the exposed side of the structure.

7. A structure of the class described composed of assembled blocks each having a longitudinal cavity open at one end to receive a portion of the wave and closed at its inner end to confine fluid therein, a vent extending through one of the walls of the block and communicating with the closed end of the cavity, and a vent passage extending longitudinally between two adjacent blocks and leading from said vent to the atmosphere.

8. A block adapted for use in the building of marine structures having a longitudinal cavity provided with an enlarged end opening at one end of the block, and the walls converging to form an apex at the closed inner end thereof.

9. A block of the class described provided with a longitudinal cavity leading from one end of the block inwardly, the longitudinal walls of the cavity converging toward the inner end, and vents extending through the walls of the block and communicating with the closed inner end of the cavity therein.

10. A structure of the class described comprising a plurality of assembled blocks, having wave cushioning means formed in the exposed faces thereof one of the blocks being provided with a locking pin adapted to register with a corresponding aperture in an adjacent block and having recesses in its upper face extending toward the sides thereof, and keys having enlarged ends adapted to fit into the recesses of adjacent blocks for locking them from lateral displacement.

In testimony whereof I have hereunto set my hand in presence of two subscribing witnesses.

WILLIAM SMITH.

Witnesses:
 SUSAN E. DU BOIS,
 ARVER FARISH.